United States Patent
Labrecque et al.

(10) Patent No.: US 12,116,937 B1
(45) Date of Patent: Oct. 15, 2024

(54) BOOSTING GAS TURBINE ENGINE POWER WITH FLUID MOTOR

(71) Applicant: Pratt & Whitney Canada Corp., Longueuil (CA)

(72) Inventors: Michel Labrecque, Ste-Julie (CA); Patrick Valois, Longueuil (CA); Karine Berube, Sainte-Therese (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 18/129,646

(22) Filed: Mar. 31, 2023

(51) Int. Cl.
*F02C 7/36* (2006.01)
*F02C 3/10* (2006.01)
*F02C 3/107* (2006.01)
*F02C 7/27* (2006.01)
*F02C 7/32* (2006.01)

(52) U.S. Cl.
CPC ............... *F02C 7/36* (2013.01); *F02C 3/10* (2013.01); *F02C 3/107* (2013.01); *F02C 7/32* (2013.01); *F02C 7/27* (2013.01)

(58) Field of Classification Search
CPC ...... F02C 7/27; F02C 7/32; F02C 7/36; F02C 3/10; F02C 3/107
See application file for complete search history.

(56) References Cited

U.S. PATENT DOCUMENTS

| | | | |
|---|---|---|---|
| 4,084,825 A * | 4/1978 | Ludwig | F16J 15/3456 277/348 |
| 10,495,003 B1 * | 12/2019 | Slayter | F02C 7/268 |
| 10,753,225 B2 | 8/2020 | Karnofski | |
| 11,161,603 B2 | 11/2021 | Vallart | |
| 2006/0010875 A1 * | 1/2006 | Mahoney | F02C 3/13 60/802 |
| 2008/0296909 A1 | 12/2008 | Dipasquale, Jr. | |
| 2009/0314002 A1 * | 12/2009 | Libera | F02C 7/277 60/778 |
| 2013/0133332 A1 * | 5/2013 | Macfarlane | F04D 19/026 60/773 |
| 2015/0246733 A1 | 9/2015 | Silet | |
| 2015/0360773 A1 * | 12/2015 | Allen | B64C 23/072 416/131 |
| 2017/0234235 A1 * | 8/2017 | Pech | F02C 7/36 290/31 |

(Continued)

*Primary Examiner* — William H Rodriguez
(74) *Attorney, Agent, or Firm* — Getz Balich LLC (57) ABSTRACT

An aircraft system is provided that includes a thrust rotor and a powerplant coupled to and configured to drive rotation of the thrust rotor. The powerplant includes a gas turbine engine, a drivetrain and a fluid motor. The gas turbine engine includes a rotating assembly, a compressor section, a combustor section, a turbine section and a flowpath extending through the compressor section, the combustor section and the turbine section. The rotating assembly includes a turbine rotor in the turbine section. The turbine rotor is configured to convert fluid power of combustion products flowing through the flowpath within the turbine section into mechanical power for driving rotation of the rotating assembly during a mode of engine operation. The drivetrain is configured to rotatably couple the fluid motor to the rotating assembly. The fluid motor is configured to boost the mechanical power for driving the rotation of the rotating assembly during the mode of engine operation.

19 Claims, 5 Drawing Sheets

(56) References Cited

U.S. PATENT DOCUMENTS

| | | | |
|---|---|---|---|
| 2017/0234237 A1* | 8/2017 | Pech | F01D 15/10 |
| | | | 60/778 |
| 2017/0305541 A1 | 10/2017 | Vallart | |
| 2018/0010522 A1* | 1/2018 | Harder | F01D 21/12 |
| 2018/0010523 A1* | 1/2018 | Harder | F02C 7/36 |
| 2018/0022465 A1* | 1/2018 | Gelwan | F02C 9/00 |
| | | | 60/778 |
| 2018/0172012 A1* | 6/2018 | Plante | F01D 9/02 |
| 2018/0216537 A1* | 8/2018 | Greenberg | F02C 9/18 |
| 2018/0265210 A1* | 9/2018 | Leachman | B64D 37/005 |
| 2018/0298777 A1* | 10/2018 | Nguyen | F02C 7/36 |
| 2018/0346100 A1* | 12/2018 | Veilleux, Jr. | F01D 25/34 |
| 2019/0128141 A1* | 5/2019 | Pech | F02C 7/277 |
| 2019/0186289 A1* | 6/2019 | Dhabade | F01D 21/12 |
| 2020/0355122 A1* | 11/2020 | Foutch | F02C 9/18 |
| 2020/0362760 A1* | 11/2020 | Morenko | F02C 7/232 |
| 2022/0074349 A1 | 3/2022 | Valois | |
| 2022/0297846 A1 | 9/2022 | Mark | |

\* cited by examiner

BOOSTING GAS TURBINE ENGINE POWER WITH FLUID MOTOR

TECHNICAL FIELD

This disclosure relates generally to an aircraft and, more particularly, to boosting power from a gas turbine engine.

BACKGROUND INFORMATION

An aircraft propulsion system may include a thrust rotor and a gas turbine engine for driving rotation of the thrust rotor. The aircraft propulsion system may also include an electric motor for further driving rotation of the thrust rotor under certain conditions. While such an aircraft propulsion system has various benefits, there is still room in the art for improvement.

SUMMARY

According to an aspect of the present disclosure, an aircraft system is provided that includes a thrust rotor and a powerplant coupled to and configured to drive rotation of the thrust rotor. The powerplant includes a gas turbine engine, a drivetrain and a fluid motor. The gas turbine engine includes a rotating assembly, a compressor section, a combustor section, a turbine section and a flowpath extending through the compressor section, the combustor section and the turbine section. The rotating assembly includes a turbine rotor in the turbine section. The turbine rotor is configured to convert fluid power of combustion products flowing through the flowpath within the turbine section into mechanical power for driving rotation of the rotating assembly during a mode of engine operation. The drivetrain is configured to rotatably couple the fluid motor to the rotating assembly. The fluid motor is configured to boost the mechanical power for driving the rotation of the rotating assembly during the mode of engine operation.

According to another aspect of the present disclosure, another aircraft system is provided that includes a thrust rotor and a powerplant. The powerplant includes a gas turbine engine, a drivetrain and a fluid motor. The gas turbine engine includes a rotating assembly, a compressor section, a combustor section, a turbine section and a flowpath extending through the compressor section, the combustor section and the turbine section. The rotating assembly includes a turbine rotor in the turbine section. The rotating assembly is configured to drive rotation of the thrust rotor. The drivetrain is configured to rotatably couple the fluid motor to the rotating assembly. The fluid motor is configured to drive rotation of the rotating assembly.

According to still another aspect of the present disclosure, another aircraft system is provided that includes a gas turbine engine, a fluid motor and a drivetrain. The gas turbine engine includes a rotating assembly, a compressor section, a combustor section, a turbine section and a flowpath extending through the compressor section, the combustor section and the turbine section. The rotating assembly includes a turbine rotor in the turbine section. The fluid motor is configured to drive rotation of the rotating assembly during a first mode of operation. The drivetrain is configured to rotatably couple the fluid motor to the rotating assembly during the first mode of operation. The drivetrain is configured to decouple the fluid motor from the rotating assembly during a second mode of operation.

The aircraft system may also include a thrust rotor and a powerplant configured to drive rotation of the thrust rotor. The powerplant may include the gas turbine engine, the fluid motor and the drivetrain.

The fluid motor may be configured to boost mechanical power provided by the turbine rotor for driving the rotation of the rotating assembly.

The fluid motor may be powered by a hydraulic fluid or a pneumatic fluid.

The fluid motor may be configured as or otherwise include a hydraulic motor.

The fluid motor may be configured as or otherwise include a pneumatic motor.

The powerplant may also include an electric pump fluidly coupled with the fluid motor. The electric pump may be configured to pump fluid to the fluid motor to power operation of the fluid motor.

The powerplant may also include a mechanical pump fluidly coupled with the fluid motor. The mechanical pump may be configured to pump fluid to the fluid motor to power operation of the fluid motor.

The powerplant may also include a second gas turbine engine rotatably coupled with and configured to drive the mechanical pump.

The powerplant may also include a pressure tank fluidly coupled with the fluid motor. The pressure tank may be configured to direct fluid to the fluid motor to power operation of the fluid motor.

The drivetrain may include a clutch.

The drivetrain may be configured to: rotatably couple the fluid motor to the rotating assembly during the mode of engine operation; and decouple the fluid motor from the rotating assembly during a second mode of engine operation.

The rotating assembly may also include a compressor rotor in the compressor section.

The gas turbine engine may also include a second rotating assembly coupled to and configured to drive the rotation of the thrust rotor. The second rotating assembly may include a second turbine rotor in the turbine section.

The rotating assembly may be coupled to and configured to drive the rotation of the thrust rotor.

The turbine rotor may also be configured to convert the fluid power of the combustion products flowing through the flowpath within the turbine section into the mechanical power for driving the rotation of the rotating assembly during a second mode of engine operation. The fluid motor may be non-operational during the second mode of engine operation.

The thrust rotor may be configured as or otherwise include a propeller rotor.

The thrust rotor may be configured as or otherwise include a rotorcraft rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
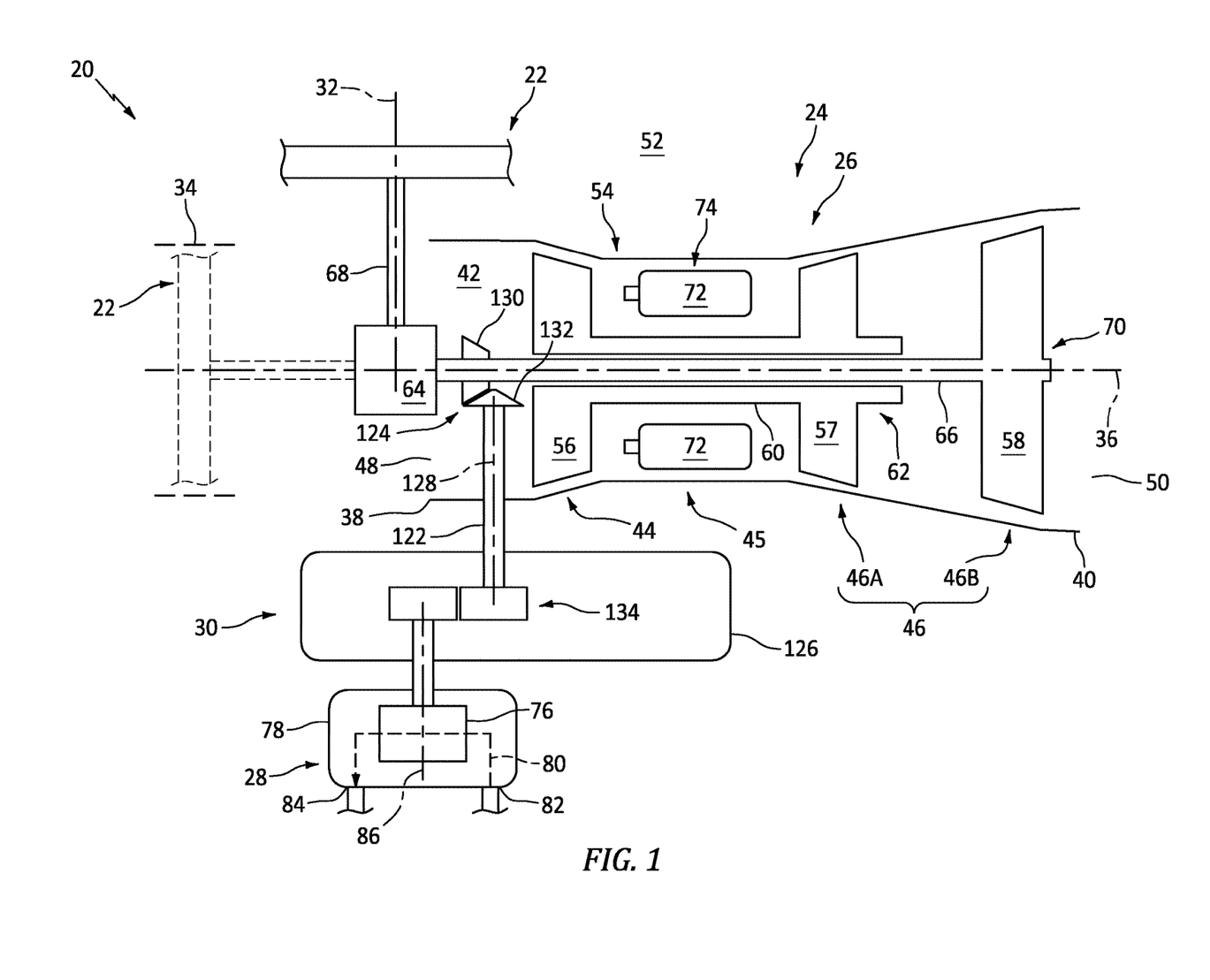
FIG. 1 is a partial schematic illustration of an aircraft system with a fluid motor operatively coupled with a first rotating assembly of a gas turbine engine.

FIG. 1 illustrates a system 20 for an aircraft. This aircraft may be a rotorcraft (e.g., a helicopter), an airplane or any other manned or unmanned aerial vehicle. The aircraft system 20 is configured as or otherwise includes a propulsion system for the aircraft. This aircraft propulsion system may be an open rotor propulsion system such as, but not limited to, a turboshaft propulsion system or a turboprop propulsion system. Alternatively, the aircraft propulsion system may be a ducted propulsion system such as, but not limited to, a turbofan propulsion system. However, for ease of description, the aircraft system 20 may be generally described below as the open rotor propulsion system; e.g., the turboshaft propulsion system.

The aircraft system 20 includes a (e.g., propulsion and/or lift) thrust rotor 22 and a powerplant 24 coupled to and configured to power (e.g., mechanically drive rotation of) the thrust rotor 22. The powerplant 24 includes a gas turbine engine 26, a fluid motor 28 and a drivetrain 30.

The thrust rotor 22 has a propulsor axis 32, which propulsor axis 32 may be a centerline axis and/or a rotational axis of the thrust rotor 22. The thrust rotor 22 is configured as a (e.g., unshrouded) bladed rotor. The thrust rotor 22 may be an open thrust rotor (e.g., an un-ducted rotor) such as a (e.g., main) rotorcraft rotor for the turboshaft propulsion system. With such a configuration (see solid line rotor), the propulsor axis 32 may be substantially vertical relative to gravity. Other examples of the open rotor include, but are not limited to, a propeller rotor for the turboprop propulsion system, an open rotor for a propfan propulsion system and an open rotor for a pusher fan propulsion system. With such configurations (see dashed line rotor), the propulsor axis 32 may be substantially horizontal relative to gravity. Alternatively, the thrust rotor 22 may be a ducted rotor such as a fan rotor for the turbofan propulsion system. Where the thrust rotor 22 is a ducted rotor, the thrust rotor 22 is housed within a duct 34 such as a fan duct. With such a configuration (see dashed line rotor), the propulsor axis 32 may be substantially horizontal relative to gravity. The present disclosure, however, is not limited to the foregoing exemplary open and ducted thrust rotor configurations and the thrust rotor 22 may be configured as another type of air mover. However, for ease of description, the thrust rotor 22 may be generally described below as the open thrust rotor; e.g., the rotorcraft rotor.

The gas turbine engine 26 of FIG. 1 extends axially along an engine axis 36 from a first end 38 (e.g., an upstream and/or forward end) of the gas turbine engine 26 to a second end 40 (e.g., a downstream and/or aft end) of the gas turbine engine 26. The engine axis 36 may be a centerline axis and/or a rotational axis of the gas turbine engine 26 and/or one or more internal members of the gas turbine engine 26. The engine axis 36 may be substantially horizontal relative to gravity. The engine axis 36 of FIG. 1 may thereby be angularly offset from (e.g., perpendicular to, acutely angled from) the propulsor axis 32 (see solid line rotor). The engine axis 36, however, may alternatively be parallel with (e.g., coaxial with, laterally offset from, etc.) the propulsor axis 32 (see dashed line rotor).

The gas turbine engine 26 includes a core flowpath 42, a compressor section 44, a combustor section 45 and a turbine section 46. The turbine section 46 of FIG. 1 includes a high pressure turbine (HPT) section 46A and a low pressure turbine (LPT) section 46B, which LPT section 46B may also be referred to as a power turbine (PT) section of the gas turbine engine 26.

The core flowpath 42 extends sequentially through the compressor section 44, the combustor section 45, the HPT section 46A and the LPT section 46B from an airflow inlet 48 into the core flowpath 42 to a combustion products exhaust 50 from the core flowpath 42. The core inlet 48 may be an airflow inlet into the gas turbine engine 26 from an external environment 52, which external environment 52 may be an environment outside of the gas turbine engine 26 and, more generally, the aircraft system 20. The core inlet 48 may be disposed at or about the engine first end 38. The core exhaust 50 may be a combustion products exhaust from the gas turbine engine 26 into the external environment 52. The core exhaust 50 may be arranged at or about the engine second end 40.

The engine sections 44-46B are arranged within an engine housing 54. Each of the engine sections 44, 46A and 46B includes a respective bladed rotor 56-58. Each of these bladed rotors 56-58 includes a plurality of rotor blades arranged circumferentially around and connected to one or more respective rotor disks or hubs. The rotor blades, for example, may be formed integral with or mechanically fastened, welded, brazed, adhered and/or otherwise attached to the respective rotor disk(s)/hub(s).

The compressor rotor 56 is connected to the HPT rotor 57 through a high speed shaft 60. At least (or only) the compressor rotor 56, the high speed shaft 60 and the HPT rotor 57 may collectively form a high speed (HS) rotating assembly 62 of the gas turbine engine 26. The LPT rotor 58 is connected to a geartrain 64 through a low speed shaft 66. The geartrain 64 is connected to the thrust rotor 22 through a propulsor shaft 68. This geartrain 64 may provide a speed change mechanism between the low speed shaft 66 and the propulsor shaft 68 such that the thrust rotor 22 may rotate at a different (e.g., slower) rotational speed than the LPT rotor 58. The geartrain 64 may also or alternatively provide an angled coupling between the low speed shaft 66 and the propulsor shaft 68. At least (or only) the LPT rotor 58, the low speed shaft 66 and the geartrain 64 may collectively form a low speed (LS) rotating assembly 70 of the gas turbine engine 26. In other embodiments, however, the LS rotating assembly 70 may have a direct drive configuration where, for example, the geartrain 64 is omitted and the propulsor shaft 68 is directly connected to (or configured integral with) the low speed shaft 66; e.g., for the dashed line rotor applications.

The rotating assemblies 62 and 70 and their shafts 60 and 66 are supported by a plurality of bearings. Each of these bearings is connected to the engine housing 54 by one or more support structures; e.g., struts, frames, etc. Each of the rotating assemblies 62 and 70 may thereby be rotatable about the engine axis 36, or another rotational axis of the respective rotating assembly 62, 70.

During gas turbine engine operation, air enters the core flowpath 42 through the core inlet 48 and is directed into the compressor section 44. The air within the core flowpath 42 may be referred to as "core air". This core air is compressed by the compressor rotor 56 and is directed into a combustion chamber 72 (e.g., an annular chamber) of a combustor 74 within the combustor section 45. The fuel is injected into the combustion chamber 72 by one or more fuel injectors and mixed with the compressed air to provide a fuel-air mixture. This fuel-air mixture is ignited and combustion products thereof flow through and sequentially cause the HPT rotor 57 and the LPT rotor 58 to rotate before being exhausted from the gas turbine engine 26 through the core exhaust 50. The rotation of the HPT rotor 57 drives rotation of the compressor rotor 56 and, thus, compression of the air received from the core inlet 48. The rotation of the LPT rotor 58 and, more generally, the LS rotating assembly 70 provides drives rotation of the thrust rotor 22. The rotation of the thrust rotor 22 additional air (e.g., air in the external environment 52, or air within the duct 34) to provide aircraft thrust and/or aircraft lift. Thus, during gas turbine engine operation, the HPT rotor 57 is operable to convert fluid power of the combustion products flowing within the core flowpath 42 across the HPT section 46A and its HPT rotor 57 into mechanical power for driving rotation of the HS rotating assembly 62 and its compressor rotor 56. Similarly, the LPT rotor 58 is operable to convert (e.g., remaining) fluid power of the combustion products flowing within the core flowpath 42 across the LPT section 46B and its LPT rotor 58 into mechanical power for driving rotation of the LS rotating assembly 70 and the coupled thrust rotor 22. The present disclosure, however, is not limited to such an exemplary gas turbine engine. The LS rotating assembly 70, for example, may also include a compressor rotor. In another example, the gas turbine engine 26 may include more than two rotating assemblies.

The fluid motor 28 may be disposed outside of the gas turbine engine 26. The fluid motor 28 of FIG. 1, for example, is attached (directly or indirectly) to an exterior of the engine housing 54. The fluid motor 28 may be configured as or otherwise include a hydraulic motor or a pneumatic motor. The fluid motor 28 of FIG. 1, for example, includes a motor rotor 76 (e.g., impeller), a motor housing 78 and a motor flowpath 80. The motor rotor 76 is arranged within the motor housing 78 and projects in and/or across the motor flowpath 80. The motor flowpath 80 extends through the motor housing 78 from an inlet 82 into the motor housing 78 to an outlet 84 from the motor housing 78. With this arrangement, a working fluid may be directed through the motor flowpath 80 and across the motor rotor 76 from the motor inlet 82 to the motor outlet 84 to drive rotation of the motor rotor 76 about a motor axis 86, which motor axis 86 is a centerline axis and/or a rotational axis of the motor rotor 76.

Figure 2A:
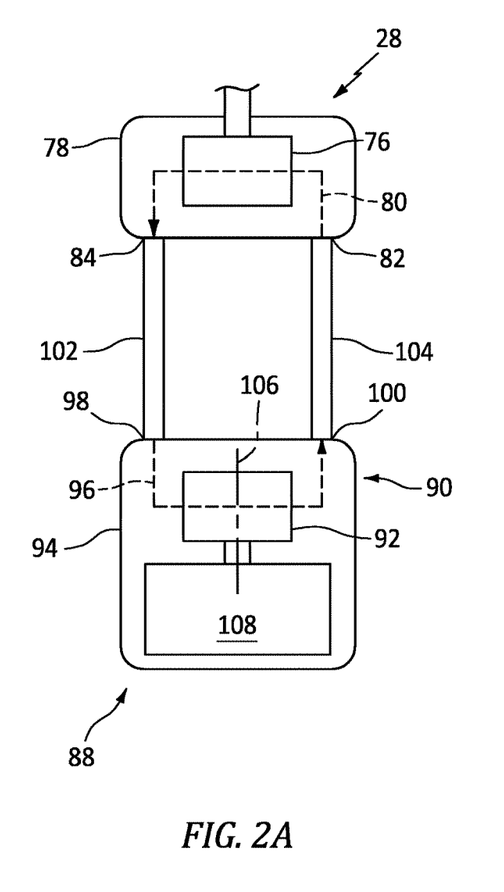
FIGS. 2A-C are schematic illustrations of various fluid sources for powering the fluid motor.
Figure 2B:
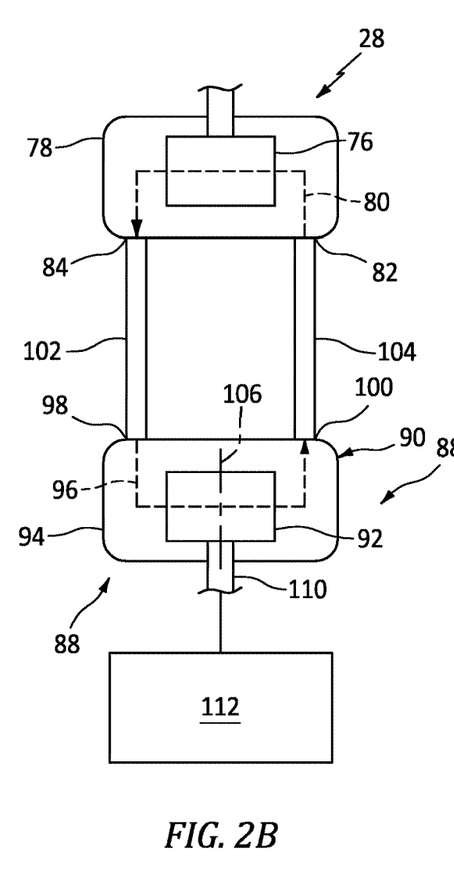
Figure 2C:
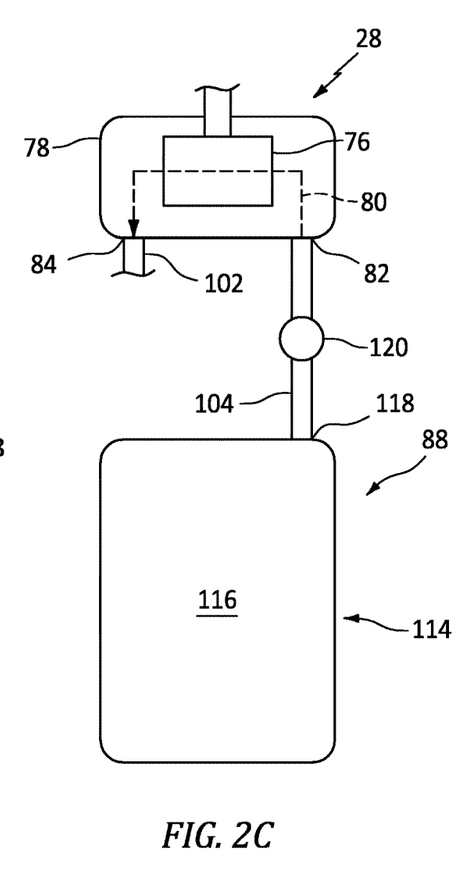

The working fluid may be a hydraulic fluid (e.g., a non-compressible liquid such as oil) where the fluid motor 28 is configured as the hydraulic motor. The working fluid may be a pneumatic fluid (e.g., a compressible gas such as air) where the fluid motor 28 is configured as the pneumatic motor. Referring to FIGS. 2A-C, the working fluid is provided to the fluid motor 28 from a working fluid source 88. This working fluid source 88 may be disposed outside of the gas turbine engine 26. The present disclosure, however, is not limited to such an exemplary fluid pump location.

Referring to FIGS. 2A and 2B, the working fluid source 88 may include a fluid pump 90. This fluid pump 90 may be configured as or otherwise include a hydraulic pump or a pneumatic pump (e.g., a compressor). The fluid pump 90 of FIGS. 2A and 2B, for example, includes a pump rotor 92 (e.g., impeller), a pump housing 94 and a pump flowpath 96. The pump rotor 92 is arranged within the pump housing 94 and projects in and/or across the pump flowpath 96. The pump flowpath 96 extends through the pump housing 94 from an inlet 98 into the pump housing 94 to an outlet 100 from the pump housing 94. The pump inlet 98 may be fluidly coupled to the motor outlet 84 through a return circuit 102. Alternatively, the pump inlet 98 and/or the motor outlet 84 may each be fluidly coupled with a respective volume inside or outside of the aircraft system 20; e.g., the external environment 52. Referring again to FIGS. 2A and 2B, the pump outlet 100 is fluidly coupled to the motor inlet 82 through a supply circuit 104. With this arrangement, the pump rotor 92 may be rotated about a pump axis 106 to direct (e.g., pump) the working fluid out of the fluid pump 90, through the supply circuit 104 and to the fluid motor 28, which pump axis 106 is a centerline axis and/or a rotational axis of the pump rotor 92.

Referring to FIG. 2A, the pump rotor 92 may be rotatably driven by an electric motor 108. The fluid pump 90 of FIG. 2A, for example, is configured as an electric pump. This electric pump may receive electricity from at least one electric power source (or multiple electric power sources). Examples of the electric power source(s) include, but are not limited to: one or more batteries and/or one or more other power storage devices; one or more fuel cells; and/or at least one electric generator. The electric power source(s) may be associated with the gas turbine engine 26 or another gas turbine engine (or another type of heat engine) arranged with the aircraft.

Referring to FIG. 2B, the pump rotor 92 may be rotatably driven by a mechanical power input 110; e.g., an input shaft. The fluid pump 90 of FIG. 2B, for example, is configured as a mechanical pump. This mechanical pump and its mechanical power input 110 may be coupled to a mechanical power output (e.g., an output shaft) of another gas turbine engine 112 (or another type of heat engine) arranged with the aircraft. In some embodiments, the other gas turbine engine 112 may also be included in the powerplant 24 and configured to mechanically power the rotation of the thrust rotor 22 (see FIG. 1); e.g., where the powerplant 24 is a multi-engine powerplant.

Referring to FIG. 2C, the working fluid source 88 may alternatively be configured as or otherwise include a pressure tank 114. This pressure tank 114 includes an internal cavity 116 configured to contain a quantity of the working fluid and, in particular, the pneumatic fluid at an elevated pressure. An outlet 118 from the pressure tank 114 is fluidly coupled with the motor inlet 82 through the supply circuit 104. The supply circuit 104 (or the pressure tank 114) may include a flow regulator 120 (e.g., a valve) configured to meter a flow of the working fluid out of the pressure tank 114, through the supply circuit 104 and into the fluid pump 90. While this working fluid source 88 of FIG. 2C is described above as a pressure tank, it is contemplated the working fluid source 88 may alternatively be another pressurized fluid source such as, but not limited to, a compressor section of another gas turbine engine (or another type of heat engine) arranged with the aircraft.

Referring to FIG. 1, the drivetrain 30 is configured to couple the motor rotor 76 to the LS rotating assembly 70. The drivetrain 30 of FIG. 1, for example, includes a tower shaft 122, an inner coupling 124 and a gearbox 126; e.g., an accessory gearbox.

The tower shaft 122 is rotatable about a rotational axis 128 of the tower shaft 122. This shaft axis 128 is angularly offset from the engine axis 36 by an angle. This angle may be a right degrees (90°) or a non-zero acute angle. The tower shaft 122 extends longitudinally along its shaft axis 128 between and to an inner end of the tower shaft 122 and an outer end of the tower shaft 122. The shaft inner end is disposed within the engine housing 54, for example axially along the engine axis 36 between the HS rotating assembly 62 and its compressor rotor 56 and the geartrain 64. The shaft outer end may be disposed outside of the gas turbine engine 26 and its engine housing 54. The tower shaft 122 is rotatably coupled to the LS rotating assembly 70 at the shaft inner end through the inner coupling 124. The tower shaft 122 is rotatably coupled to the gearbox 126 at the shaft outer end.

The inner coupling 124 rotationally couples the tower shaft 122 to the LS rotating assembly 70 and, for example, its low speed shaft 66. The inner coupling 124 of FIG. 1 for example, includes a ring gear 130 and a pinion gear 132. The ring gear 130 circumscribes the LS rotating assembly 70 and its low speed shaft 66. The ring gear 130 is mounted to and fixedly rotatable with the LS rotating assembly 70 and its low speed shaft 66. The pinion gear 132 is arranged at the shaft inner end. The pinion gear 132 is mounted to and fixedly rotatable with the tower shaft 122. The pinion gear 132 is also mated (e.g., meshed) with the ring gear 130.

The gearbox 126 may be disposed outside of the gas turbine engine 26. The gearbox 126 of FIG. 1, for example, is attached (directly or indirectly) to the exterior of the engine housing 54. The gearbox 126 is configured to operatively couple the motor rotor 76 to the tower shaft 122. The gearbox 126 of FIG. 1, for example, includes internal gearing 134 which couples and transmits torque between the motor rotor 76 and the tower shaft 122.

Figure 3:
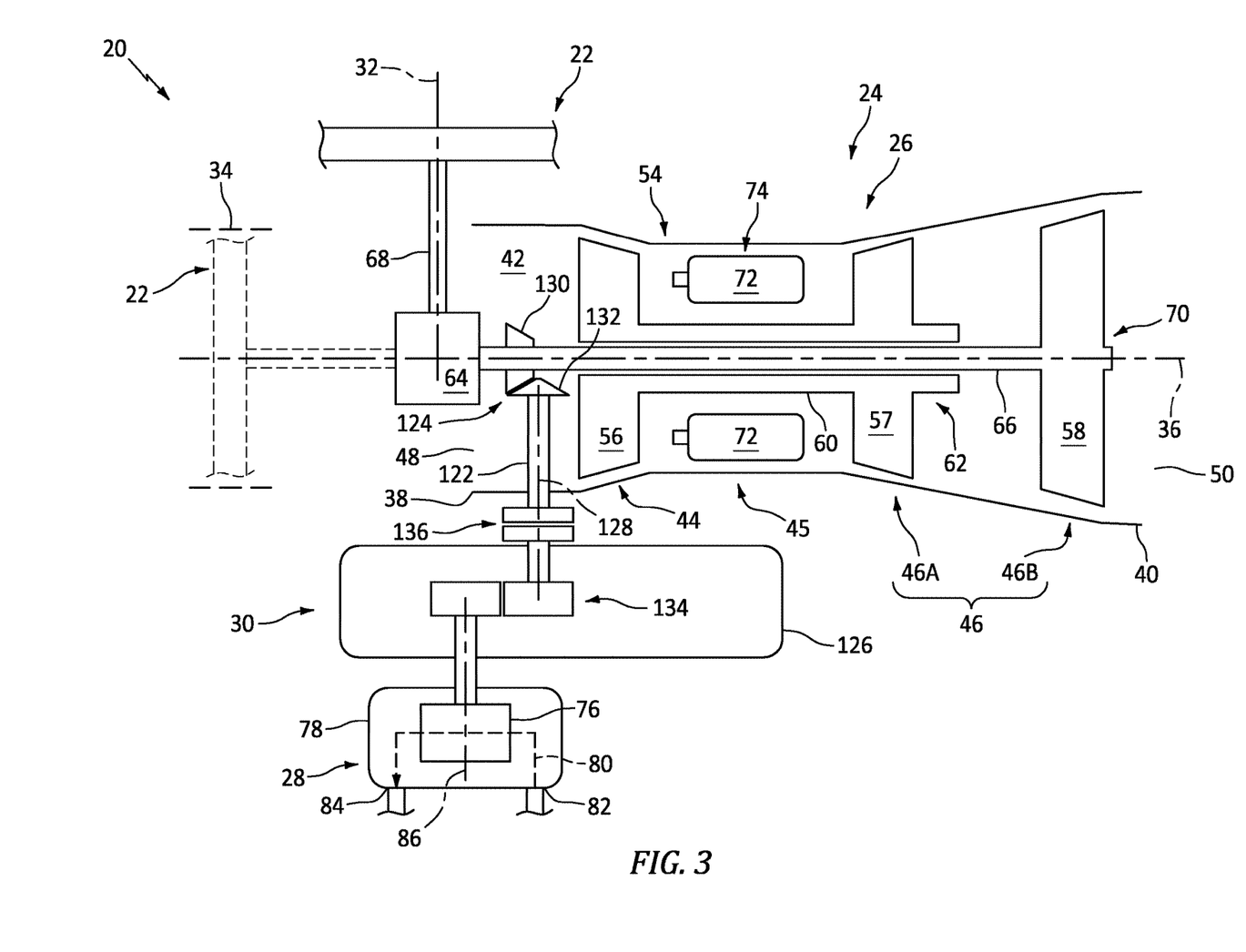
FIG. 3 is a partial schematic illustration of the aircraft system with the fluid motor selectively operatively coupled with the first rotating assembly.
Figure 4:
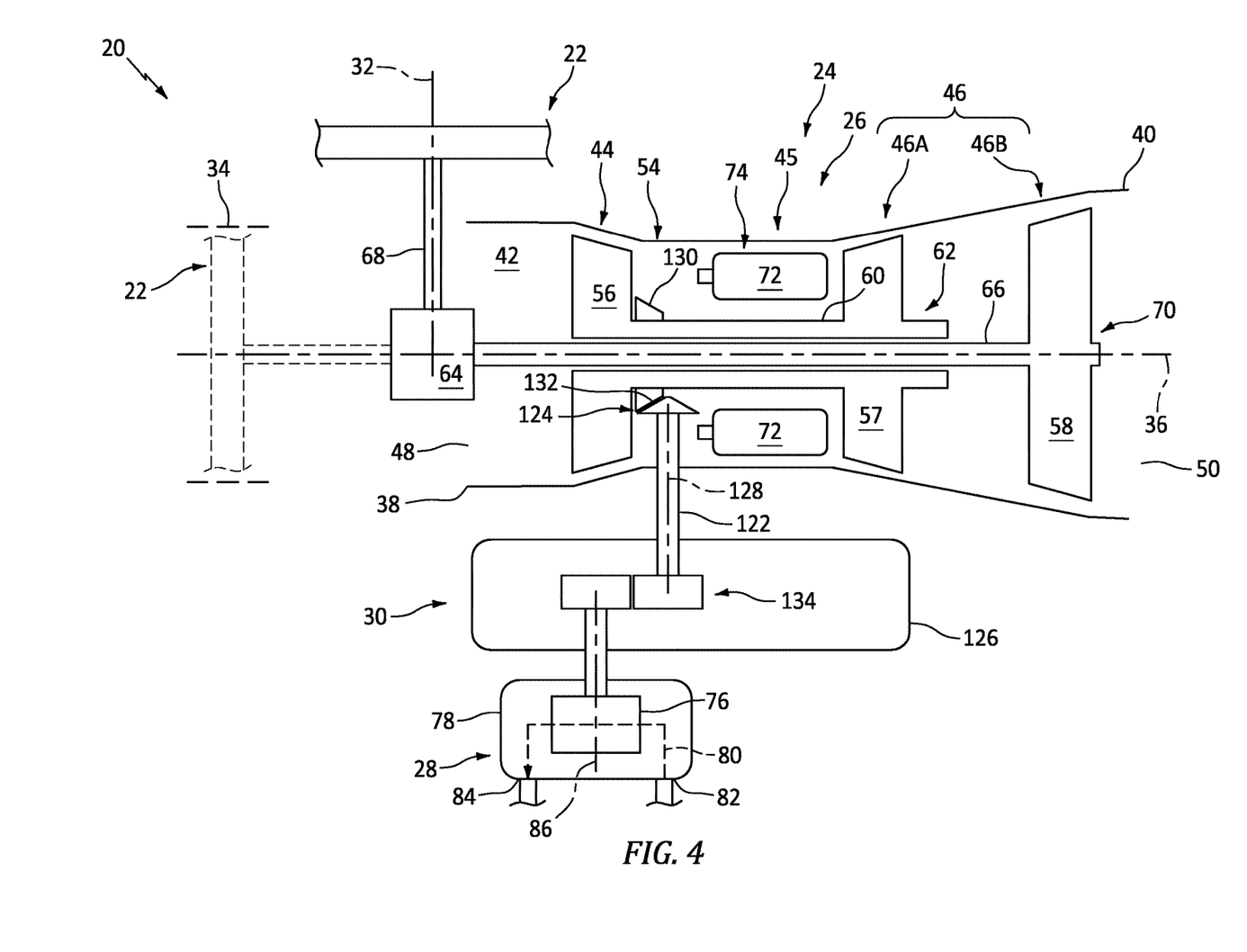
FIG. 4 is a partial schematic illustration of the aircraft system with the fluid motor operatively coupled with another rotating assembly of the gas turbine engine.

With the arrangement of FIG. 1, the drivetrain 30 is configured to provide a fulltime coupling between the motor rotor 76 and the LS rotating assembly 70. The motor rotor 76 and the LS rotating assembly 70, for example, may always rotate with one another. However, referring to FIG. 3, the drivetrain 30 may alternatively be configured to selectively: (a) couple the gearbox 126/the fluid motor 28 and its motor rotor 76 to the LS rotating assembly 70 and its low speed shaft 66 during certain mode(s) of engine operation; and (b) decouple the gearbox 126/the fluid motor 28 and its motor rotor 76 from the LS rotating assembly 70 and its low speed shaft 66 during other mode(s) of engine operation. With such an arrangement, the drivetrain 30 may couple the fluid motor 28 to the LS rotating assembly 70 when the fluid motor 28 is operational (e.g., fluidly powered on). However, when the fluid motor 28 is non-operational (e.g., fluidly powered off), the drivetrain 30 may decouple the fluid motor 28 from the LS rotating assembly 70 to reduce rotational drag on the LS rotating assembly 70. The drivetrain 30 of FIG. 4, for example, includes a clutch 136 or another actuatable coupling/decoupling device arranged between, for example, the tower shaft 122 and the gearbox 126. However, it is contemplated the clutch 136 or other actuatable coupling/decoupling device may alternatively be arranged between the gearbox 126 and the fluid motor 28, for example where the gearbox 126 is coupled to one or more other engine accessories.

During operation of the powerplant 24 of FIG. 1, the gas turbine engine 26 is operated as described above to at least partially or completely drive rotation of the thrust rotor 22 using the mechanical power provided by the LPT rotor 58. During at least an un-boosted mode of engine operation, the fluid motor 28 may be non-operational such that the thrust rotor 22 is (e.g., completely, only) driven by the mechanical power generated by the gas turbine engine 26 and, more particularly, provided by the LPT rotor 58. This un-boosted mode of engine operation may correspond to/be used when the gas turbine engine 26 is operated in a substantially or complete steady state; e.g., steady state idle, steady state low throttle, steady state mid throttle, steady state high throttle, etc. By contrast, during at least a boosted mode of engine operation which might correspond but not necessarily limited to an emergency situation, the fluid motor 28 is operated to boost the mechanical power generated by the gas turbine engine 26 and, more particularly, provided by the LPT rotor 58. More particularly, the fluid motor 28 is operated to provide the LS rotating assembly 70 (through the drivetrain 30) with additional mechanical power for rotating the thrust rotor 22. This boosted mode of engine operation may correspond to/be used when the gas turbine engine 26 is operated in a transient state. The fluid motor 28, for example, may be operated to boost the mechanical power to the LS rotating assembly 70 when, for example, there is a relatively quick (e.g., rapid) increase in power demand. Such a relatively quick increase in power demand may occur when the gas turbine engine 26 is spooled up to, for example, (e.g., rapidly) accelerate out of idle or sub-idle or (e.g., rapidly) accelerate from mid throttle to high throttle to perform, for example, a quick maneuver. The fluid motor 28, moreover, may decrease a spool up response differential between the LS rotating assembly 70 and the HS rotating assembly 62. Of course, it is also contemplated that the boosted mode of engine operation may also occur during steady state operation where, for example, max throttle is needed for a certain period of time, etc.

The fluid motor 28 is described above as operating while the gas turbine engine 26 is operational; e.g., the combustion products are being produced in the combustor section 45. It is contemplated, however, the fluid motor 28 may also (or alternatively) be operated when the gas turbine engine 26 is non-operational; e.g., following a combustor flameout, etc. The fluid motor 28, for example, may be operated (e.g., in an emergency) to mechanically power the thrust rotor 22 and maintain at least a threshold (e.g., minimum) quantity of aircraft thrust and/or aircraft lift.

Figure 5:
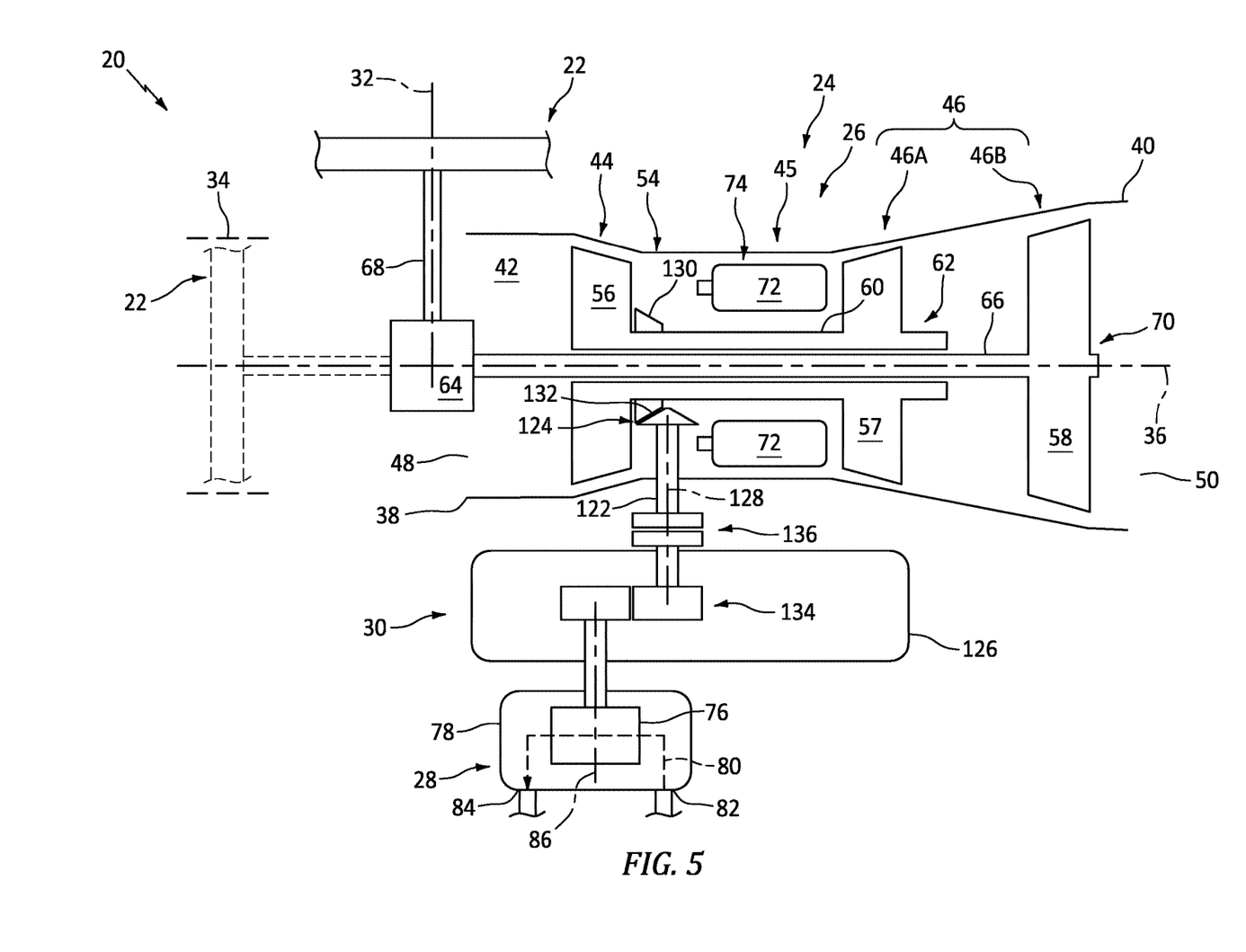
FIG. 5 is a partial schematic illustration of the aircraft system with the fluid motor selectively operatively coupled with the other rotating assembly.

The fluid motor 28 is described above as being (e.g., selectively) coupled to the LS rotating assembly 70. However, referring to FIGS. 4 and 5, the fluid motor 28 may alternatively be (e.g., selectively) coupled to the HS rotating assembly 62 in the same (or similar) manner as described above with respect to the LS rotating assembly 70. The inner coupling 124 of FIGS. 4 and 5, for example, is configured to couple the tower shaft 122 to the HS rotating assembly 62 and, for example, its high speed shaft 60. The ring gear 130, for example, circumscribes the HS rotating assembly 62 and its high speed shaft 60. The ring gear 130 is mounted to and fixedly rotatable with the HS rotating assembly 62 and its high speed shaft 60. With such an arrangement, the fluid motor 28 may be configured to boost the mechanical power provided to the HS rotating assembly 62 and its compressor rotor 56 during at least the boosted mode of engine operation. Here, in addition to assisting with transient, non-transient and emergency operation of the gas turbine engine 26 as generally described above, the fluid motor 28 may also (or alternatively) be operated to facilitate startup of the gas turbine engine 26. The fluid motor 28, for example, may be configured as a starter motor for the gas turbine engine 26.

While the powerplant 24 is described above with a single fluid motor 28, the present disclosure is not limited to such an arrangement. For example, the powerplant 24 may be configured with multiple of the fluid motors 28, where each fluid motor 28 is independently operatively coupled to a respective one of the engine rotating assemblies 62, 70. For example, the embodiment of FIG. 1 or 3 may be combined with the embodiment of FIG. 4 or 5.

While the aircraft system 20 is described above as an aircraft propulsion system, the present disclosure is not limited to such an exemplary configuration. For example, the powerplant 24 may also or alternatively drive operation of an electric generator. The aircraft system 20, for example, may alternatively be configured as an auxiliary power unit (APU) for the aircraft.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
driving rotation of a rotating assembly during a mode of engine operation by converting fluid power of combustion products flowing through a flowpath within a turbine section into mechanical power using a turbine rotor, wherein a powerplant includes a gas turbine engine, a drivetrain and a fluid motor, wherein the gas turbine engine includes the rotating assembly, a compressor section, a combustor section, the turbine section and the flowpath, wherein the flowpath extends through the compressor section, the combustor section and the turbine section, wherein the rotating assembly includes the turbine rotor in the turbine section, and wherein the mode of engine operation is different than startup of the gas turbine engine;
driving rotation of a thrust rotor using the powerplant during the mode of engine operation; and
boosting the mechanical power for driving the rotation of the rotating assembly during the mode of engine operation using the fluid motor, wherein the drivetrain rotatably couples the fluid motor to the rotating assembly.

2. The method of claim 1, wherein the mode of engine operation is a transient mode of engine operation.

3. The method of claim 1, further comprising rotating the rotating assembly during the startup of the gas turbine engine using the fluid motor.

4. The method of claim 1, wherein the fluid motor comprises a hydraulic motor.

5. The method of claim 1, wherein the fluid motor comprises a pneumatic motor.

6. The method of claim 1, wherein the powerplant further includes an electric pump fluidly coupled with the fluid motor, and the electric pump is configured to pump fluid to the fluid motor to power operation of the fluid motor.

7. The method of claim 1, wherein the powerplant further includes a mechanical pump fluidly coupled with the fluid motor, the mechanical pump is configured to pump fluid to the fluid motor to power operation of the fluid motor.

8. The method of claim 7, wherein the powerplant further includes a second gas turbine engine rotatably coupled with and configured to drive the mechanical pump.

9. The method of claim 1, wherein the powerplant further includes a pressure tank fluidly coupled with the fluid motor, and the pressure tank is configured to direct fluid to the fluid motor to power operation of the fluid motor.

10. The method of claim 1, wherein the drivetrain comprises a clutch.

11. The method of claim 1, wherein the drivetrain is configured to
rotatably couple the fluid motor to the rotating assembly during the mode of engine operation; and
decouple the fluid motor from the rotating assembly during a second mode of engine operation.

12. The method of claim 1, wherein the rotating assembly further includes a compressor rotor in the compressor section.

13. The method of claim 12, wherein the gas turbine engine further includes a second rotating assembly coupled to and configured to drive the rotation of the thrust rotor, and the second rotating assembly includes a second turbine rotor in the turbine section.

14. The method of claim 1, wherein the rotating assembly is coupled to and configured to drive the rotation of the thrust rotor.

15. The method of claim 1, wherein
the turbine rotor is further configured to convert the fluid power of the combustion products flowing through the flowpath within the turbine section into the mechanical power for driving the rotation of the rotating assembly during a second mode of engine operation; and
the fluid motor is non-operational during the second mode of engine operation.

16. The method of claim 1, wherein the thrust rotor comprises a propeller rotor.

17. The method of claim 1, wherein the thrust rotor comprises a rotorcraft rotor.

18. A method of operation, comprising:
driving rotation of a rotating assembly during a mode of engine operation by converting fluid power of combustion products flowing through a flowpath within a turbine section into mechanical power using a turbine rotor, wherein a powerplant includes a gas turbine engine, a drivetrain and a fluid motor, the gas turbine engine includes the rotating assembly, a compressor section, a combustor section, the turbine section and the flowpath, the flowpath extends through the compressor section, the combustor section and the turbine section, the rotating assembly includes the turbine rotor in the turbine section, and the mode of engine operation is a non-transient mode of engine operation;
driving rotation of a thrust rotor using the powerplant during the mode of engine operation; and
boosting the mechanical power for driving the rotation of the rotating assembly during the mode of engine operation using the fluid motor, wherein the drivetrain rotatably couples the fluid motor to the rotating assembly.

19. A method of operation, comprising:
driving rotation of a rotating assembly during a mode of engine operation by converting fluid power of combustion products flowing through a flowpath within a turbine section into mechanical power using a turbine rotor, wherein a powerplant includes a gas turbine engine, a drivetrain and a fluid motor, the gas turbine engine includes the rotating assembly, a compressor section, a combustor section, the turbine section and the flowpath, the flowpath extends through the compressor section, the combustor section and the turbine section, the rotating assembly includes the turbine rotor in the turbine section, and the mode of engine operation is an emergency mode of engine operation;
driving rotation of a thrust rotor using the powerplant during the mode of engine operation; and
boosting the mechanical power for driving the rotation of the rotating assembly during the mode of engine operation using the fluid motor, wherein the drivetrain rotatably couples the fluid motor to the rotating assembly.

\* \* \* \* \*